(No Model.)

H. MILLS, Dec'd.
F. C. Davies, Administrator.
FISH HOOK.

No. 586,992.   Patented July 27, 1897.

Witnesses

J. E. Cameron
L. Foulds

Administrator

Frederick C. Davies.
G. C. & Riches
his atty.

UNITED STATES PATENT OFFICE.

FREDERICK C. DAVIES, OF TORONTO, CANADA, ADMINISTRATOR OF HENRY MILLS, DECEASED.

FISH-HOOK.

SPECIFICATION forming part of Letters Patent No. 586,992, dated July 27, 1897.

Application filed September 24, 1896. Serial No. 606,905. (No model.) Patented in Canada May 7, 1895, No. 48,873.

*To all whom it may concern:*

Be it known that HENRY MILLS, plasterer, in his lifetime of Orillia, in the county of Simcoe, in the Province of Ontario, Canada, did invent certain new and useful Improvements in Fish-Hooks, (for which Letters Patent of the Dominion of Canada were issued on the 7th day of May, 1895, and numbered 48,873,) of which the following is a specification.

This invention relates generally to certain new and useful improvements in fish-hooks, and relates more particularly to that class of fish-hooks known as "trap-hooks;" and the object of the invention is to pivotally connect together two or more hooks, which will normally hang in a horizontal position and which will on an attempt on the part of the fish to secure the bait move in different directions; and the invention consists, essentially, of the device hereinafter more fully set forth, and more particularly pointed out in the claim.

Figure 1:
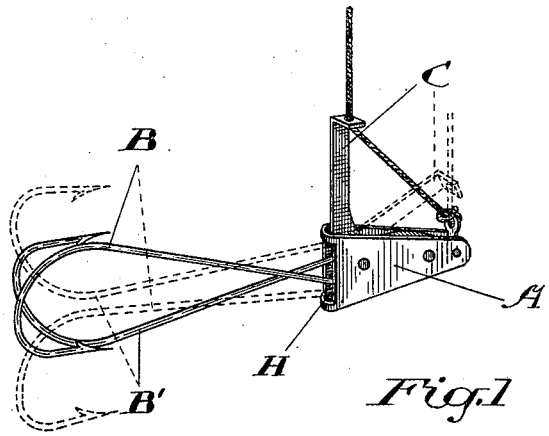
Figure 2:
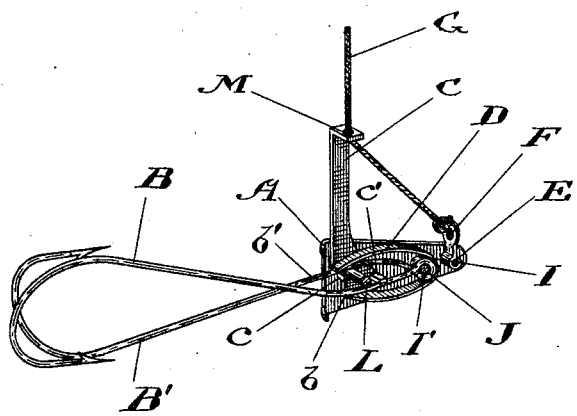

In the drawings, Figure 1 is a perspective view of the complete hook. Fig. 2 is a view showing part of the frame of the hook removed to exhibit the working parts.

Like letters of reference refer to like parts throughout the specification and drawings.

A refers to the works-case; B, to one of the fish-hooks; B', to the other of the fish-hooks; C, to the operating-lever, and D to the return-spring. The works-case A may be of any suitable size, shape, and dimensions. As shown in the drawings, this works-case consists of a substantially diamond-shaped piece of metal bent into the form of a U. Locking together the ends of the case is a rivet or pin E, upon which is loosely mounted an eye F, to which is secured one end of the fish-line G.

Formed in the lock-case A at the opposite end is a slot H, which extends nearly the entire width of the lock-case. Passing through the slot H are the shanks $b\ b'$ of the fish-hooks, respectively B B'. By reference to the drawings it will be noticed that passing through the eyes I I' of the fish-hooks B B', respectively, is a pin J and that the pin J is sufficiently smaller than the dimensions of the said eyes to permit the eyes to work freely on the said pin. It will be noticed by reference to the drawings that that part of the shanks $b\ b'$ contiguous to the eyes I I' is bolted or curved sufficient to bring the center of the head of each of the hooks opposite the center of its respective end in order that the two hooks will lie closely together when in their normal position.

Mounted on a pin L, connected to the sides of the works-case A between the pin J and the slot H, is an operating-lever C, which is provided with two lugs $c\ c'$, which are adapted to bear against the shanks $b\ b'$ of the fish-hooks in order that the hooks can be moved in opposite directions. The lever C is provided with an eye M, through which passes the fish-line G. The hooks hang normally at the end of the fish-line in a horizontal position, and the barbed portion of the respective hooks face in opposite directions. The bait is placed, preferably, on both hooks to induce the fish to take both hooks in its mouth. Upon the fish undertaking to remove the bait from the hooks it naturally pulls the hooks in a downward direction, and this movement on the part of the hooks enables the fish-line to draw the lever in the direction indicated in dotted lines. This movement of the lever expands the hooks into the position indicated in dotted lines in Fig. 1 of the drawings and has a tendency to force the barbed points into the wall of the mouth of the fish and prevents the fish jerking or working itself off the hook.

Having thus fully described the invention, what is claimed as new, and desired to be secured by Letters Patent, is—

In a trap-hook the combination of the works-case, the hooks, an eye formed at the end of the shank of each hook, a pin passing through said eyes and through the works-case to pivotally hold together the ends of the said hooks within the works-case, the shank of each of said hooks curved at that end contiguous to the said eyes, a U-shaped spring arranged to bear upon the curved portion of each of said shanks, an operating-lever pivoted within the works-case provided with two lugs, said lugs arranged to bear against the shanks and move the fish-hooks in opposite directions, said spring arranged to return and hold the said fish-hooks in their normal position, substantially as specified.

F. C. DAVIES,
*Administrator of Henry Mills, deceased.*

In presence of—
C. H. RICHES,
DONALD C. RIDOUT.